Feb. 17, 1925.                    1,526,913
L. D. KAY
DUAL TIRED TRUCK WHEEL
Filed Nov. 13, 1923
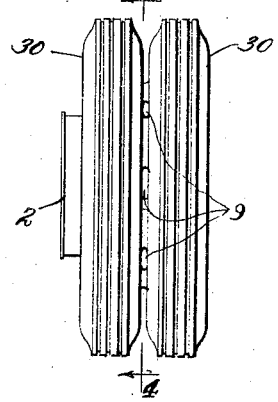
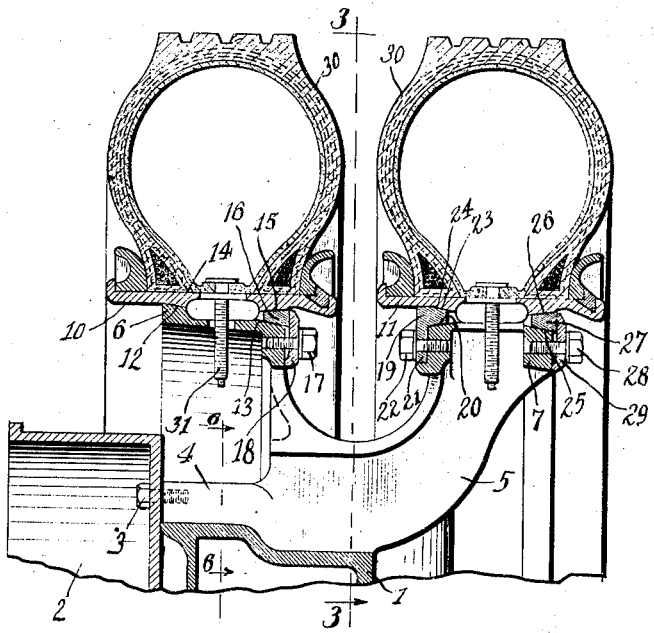
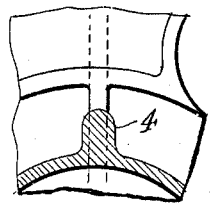
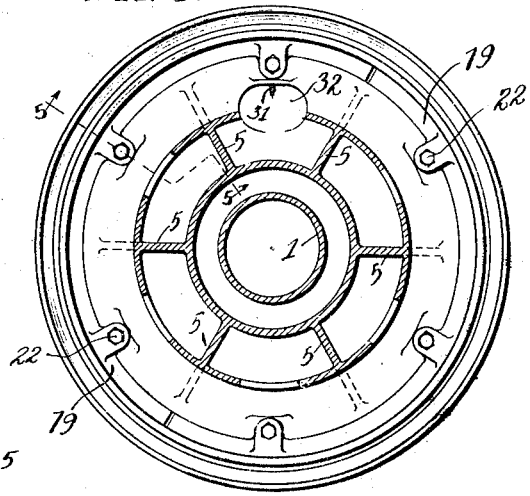
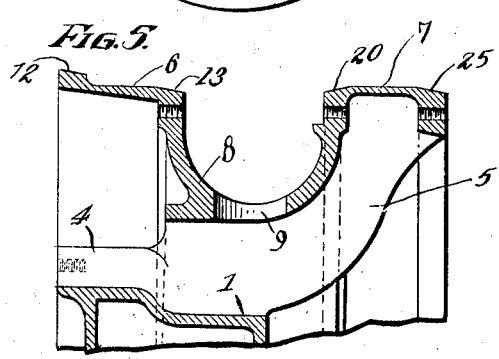
Inventor
LLOYD D. KAY
By Lyon & Lyon
Attorneys Patented Feb. 17, 1925.

1,526,913

UNITED STATES PATENT OFFICE.

LLOYD D. KAY, OF LOS ANGELES, CALIFORNIA.

DUAL-TIRED TRUCK WHEEL.

Application filed November 13, 1923. Serial No. 674,476.

*To all whom it may concern:*

Be it known that I, LLOYD D. KAY, a citizen of the United States, residing at Los Angeles, in the county of Los Angeles and State of California, have invented a new and useful Dual-Tired Truck Wheel, of which the following is a specification.

This invention relates to wheels such as used on heavy trucks, and particularly to the type of truck wheel that carries two tires.

As usually constructed such a truck wheel has a wide felloe and the two tires are mounted on the same felloe side by side with a separator ring between them. This arrangement is not adapted to pneumatic tires and has other objections.

The general object of this invention is to produce a wheel of this type which is light in weight but so constructed that it will have ample strength in service, and in which the tires can be readily put in place, the inflating nipples being easily accessible to enable the tires to be inflated.

Further objects of the invention will appear hereinafter:

The invention consists in the novel parts and combination of parts to be described hereinafter, all of which contribute to produce an efficient dual tired truck wheel.

A preferred embodiment of the invention is described in the following specification while the broad scope of the invention is pointed out in the appended claims.

In the drawings:

Fig. 1 is a front elevation of a wheel embodying my invention.

Fig. 2 is a vertical section through the rim of the wheel and through the tires adjacent their inflating nipples, and upon an enlarged scale.

Fig. 3 is a section taken about on the line 3—3 of Fig. 2 looking in the direction of the arrow but upon a smaller scale, and with the tires omitted.

Fig. 4 is a section taken in the same plane as the line 3—3 but looking in, instead of out, that is to say, looking oppositely to the direction indicated by the arrows; and this view is upon a smaller scale.

Fig. 5 is a typical section through the edge or rim of the wheel on the same scale as Fig. 2, and Fig. 6 is a fragmentary section on the line 6—6 of Fig. 2.

This wheel is intended to be constructed of cast steel or cast iron.

It comprises a hub 1 of any suitable construction, to which a brake drum 2 may be secured; bolts 3 may be used for this purpose mounted in integral posts 4 cast on the side of the hub.

The wheel has a plurality of spokes 5, in the present instance six in number. They support an inner felloe 6 and an outer felloe 7, the latter of which is displaced outwardly beyond the plane of the drum.

The spokes are connected together by a web 8, which also connects the adjacent edges of the felloes with each other; said web being preferably in the form of an arch concave on its outer side and convex on its inner side. This arch at the lower side of the wheel, which receives and transmits the ground forces to the hub, gives the wheel great strength and effectively prevents breaking of the felloes from the wheel body. In order to lighten the weight without substantially detracting from the strength, this web is provided with equidistant openings 9.

The spokes 5 are substantially flat arms with the "flat" disposed substantially in the radial plane of the wheel.

On the felloes 6 and 7 two tire rims 10 and 11 are carried. The two felloes 6 and 7 are separate and distinct from each other, and support the rims 10 and 11 so that there is a gap between the two rims.

Suitable means is provided for securing these rims removably on their corresponding felloes. For this purpose the inner felloe is provided with a rim seat 12 preferably of conical form, and is also provided with a key-ring seat 13 of smaller diameter but also of conical form. The rim 10 has a conical face 14 to rest on the seat 12 and has a conical face 15 to lie opposite and cooperate with the key-ring seat 13. This enables a wedge shaped key-ring 16 to be shoved into place between the faces 13 and 15, and when this ring is tightened home by means of bolts 17 and lugs 18, the inner rim 10 will be securely held in place. To facilitate putting this key-ring 16 in place, it is preferably constructed in the form of a split ring.

To carry the outer rim 11, I provide a fixed key-ring 19 mounted on a conical seat 20 on the inner edge of the outer felloe 7, and secured in place by means of integral lugs 21, carrying fastening bolts 22. The outer face of this key ring has a conical seat 23 similar to the seat 14 to seat a conical face 24 on the under side of rim 11, To facilitate putting it in place the ring 19 is made in two halves or in sections.

The outer edge of the felloe 7 has a conical seat 25 lying opposite to a cooperating conical face 26 on the under side of the rim 11 and in the space between these faces is received a wedge shaped key-ring 27, held in place by bolts 28 and lugs 29.

The pneumatic tires 30 may be mounted on their rims in any suitable way.

In attaching the rims, of course the inner rim is put in place first, the key-ring 16 put in place, and the bolts 17 tightened up. The felloe 7 is of smaller diameter than the seat 12 so as to permit the inner rim to pass over it freely.

After the inner rim is in place, the fixed key-ring 19 is put in place, the outer rim 11 put in place, and the key ring 27 is wedged up home by tightening the bolts 28 upon the lugs 29.

With a wheel having the features of construction of my invention the bolt heads are readily accessible to a wrench.

In order to render the inflating nipples 31 of the tires accessible, I provide the web 8 with a large gap or opening 32 adjacent the nipples.

It is understood that the embodiment of the invention described herein is only one of the many embodiments this invention may take and I do not wish to be limited in the practice of my invention nor in my claims to the particular embodiment set forth.

What I claim is:

1. A motor truck wheel having a hub with a plurality of spokes, each spoke consisting of an arm disposed in a plane extending radially from the axis of the wheel, a felloe extending continuously, connecting the ends of the arms and disposed in a plane displaced laterally from the hub, a second felloe connected with the said spokes and supported thereby and disposed substantially in the plane of the hub, said felloes having seats for securing tire rims thereto.

2. A cast motor truck wheel having a hub with a plurality of substantially radial spokes extending from the hub, each spoke consisting of a substantially flat arm disposed in a plane extending radially from the axis of the wheel, an outer felloe extending continuously around the wheel connecting the ends of the arms and disposed in a plane displaced laterally from the hub, an inner felloe distinct from and separated from the outer felloe, connected with the said spokes, supported thereby and disposed substantially in the plane of the hub, said felloes having seats for securing tire rims thereto.

3. A motor truck wheel for dual tires, having a hub with a plurality of substantially radial spokes extending from the hub, an outer felloe constructed to operate as a rim seat, an inner felloe constructed to operate as a rim seat distinct from and separate from the outer felloe, and a web connecting the felloes, said web being disposed in an arch concave on its outer side and convex on its inner side.

Signed at Los Angeles, California, this 30th day of October, 1923.

LLOYD D. KAY.